US007673083B2

(12) United States Patent  (10) Patent No.: US 7,673,083 B2
Laefer et al.  (45) Date of Patent: Mar. 2, 2010

(54) METHOD AND SYSTEM FOR CONTROLLING VIDEO SELECTION AND PLAYBACK IN A PORTABLE MEDIA PLAYER

(75) Inventors: Jay S. Laefer, Sunnyvale, CA (US); Gregory T. Lydon, Santa Cruz, CA (US); Donald J. Novotney, San Jose, CA (US); John B. Filson, San Jose, CA (US); David Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 11/519,541

(22) Filed: Sep. 11, 2006

(65) Prior Publication Data

US 2007/0300155 A1  Dec. 27, 2007

(51) Int. Cl.
*G06F 13/42* (2006.01)
*G06F 15/177* (2006.01)
*G06F 13/00* (2006.01)
*G06F 3/00* (2006.01)

(52) U.S. Cl. .................. 710/105; 709/220; 709/230; 709/246; 715/810; 715/747; 725/37; 725/47; 707/104.1; 386/46; 345/169; 345/603

(58) Field of Classification Search ................. 345/169, 345/603; 348/555, 558, 443, 454, 46; 386/46
See application file for complete search history.

(56) References Cited

U.S. PATENT DOCUMENTS

| 4,673,861 | A | 6/1987 | Dubovsky et al. |
| 4,850,899 | A | 7/1989 | Maynard |
| 4,924,216 | A | 5/1990 | Leung |
| 4,938,483 | A | 7/1990 | Yavetz |
| 5,041,025 | A | 8/1991 | Haitmanek |
| 5,055,069 | A | 10/1991 | Townsend et al. |
| 5,080,603 | A | 1/1992 | Mouissie |
| 5,104,243 | A | 4/1992 | Harding |
| 5,108,313 | A | 4/1992 | Adams |

(Continued)

FOREIGN PATENT DOCUMENTS

EP  1104150  5/2001

(Continued)

OTHER PUBLICATIONS

Universal Serial Bus Specification Revision 2.0: Apr. 27, 2000. 5 pages.*

(Continued)

*Primary Examiner*—Mark Rinehart
*Assistant Examiner*—Brian T Misiura
(74) *Attorney, Agent, or Firm*—Townsend and Townsend and Crew LLP

(57) ABSTRACT

A method and system in accordance with the present invention provides a system that allows a portable media player to control settings of the portable media player when receiving video from an accessory, to control playback of the portable media player, and to provide for navigation between video tracks in a hierarchical fashion. In so doing, a portable media player can then utilize this information to provide for the maximum functionality of the accessory when connected to the portable media player.

47 Claims, 15 Drawing Sheets

U.S. PATENT DOCUMENTS

| | | |
|---|---|---|
| 5,150,031 A | 9/1992 | James et al. |
| 5,186,646 A | 2/1993 | Pederson |
| 5,247,138 A | 9/1993 | Landmeier |
| 5,277,624 A | 1/1994 | Champion |
| 5,471,128 A | 11/1995 | Patino et al. |
| 5,525,981 A | 6/1996 | Abernethy |
| 5,586,893 A | 12/1996 | Mosquera |
| 5,592,588 A | 1/1997 | Reekes et al. |
| 5,618,045 A | 4/1997 | Kagan et al. |
| 5,648,712 A | 7/1997 | Hahn |
| 5,660,558 A | 8/1997 | Osanai et al. |
| 5,727,866 A | 3/1998 | Kraines et al. |
| 5,754,027 A | 5/1998 | Oglesbee et al. |
| 5,830,001 A | 11/1998 | Kinoshita |
| 5,845,217 A | 12/1998 | Lindell et al. |
| 5,901,049 A | 5/1999 | Schmidt et al. |
| 5,964,847 A | 10/1999 | Booth et al. |
| 5,975,957 A | 11/1999 | Noda et al. |
| 6,007,372 A | 12/1999 | Wood |
| 6,012,105 A | 1/2000 | Rubbmark et al. |
| 6,031,797 A | 2/2000 | Van Ryzint et al. |
| 6,053,773 A | 4/2000 | Wu |
| 6,078,402 A | 6/2000 | Fischer et al. |
| 6,078,789 A | 6/2000 | Bodenmann et al. |
| 6,125,455 A | 9/2000 | Yeo |
| 6,130,518 A | 10/2000 | Gabehart et al. |
| 6,139,373 A | 10/2000 | Ward et al. |
| 6,154,773 A | 11/2000 | Roberts et al. |
| 6,154,798 A | 11/2000 | Lin et al. |
| 6,161,027 A | 12/2000 | Poirel |
| 6,169,387 B1 | 1/2001 | Kaib |
| 6,175,358 B1 | 1/2001 | Scott-Jackson et al. |
| 6,178,514 B1 | 1/2001 | Wood |
| 6,184,652 B1 | 2/2001 | Yang |
| 6,184,655 B1 | 2/2001 | Malackowski |
| 6,203,345 B1 | 3/2001 | Roque et al. |
| 6,204,637 B1 | 3/2001 | Rengan |
| 6,206,480 B1 | 3/2001 | Thompson |
| 6,211,581 B1 | 4/2001 | Farrant |
| 6,211,649 B1 | 4/2001 | Matsuda |
| 6,224,420 B1 | 5/2001 | Nishio et al. |
| 6,230,205 B1 | 5/2001 | Garrity et al. |
| 6,234,827 B1 | 5/2001 | Nishio et al. |
| 6,252,380 B1 | 6/2001 | Koenck |
| 6,261,109 B1 | 7/2001 | Liu et al. |
| 6,267,623 B1 | 7/2001 | Hisamatsu |
| 6,268,845 B1 | 7/2001 | Pariza et al. |
| 6,271,605 B1 | 8/2001 | Carkner et al. |
| 6,280,251 B1 | 8/2001 | Nishio et al. |
| 6,283,789 B1 | 9/2001 | Tsai |
| 6,304,764 B1 | 10/2001 | Pan |
| 6,314,479 B1 | 11/2001 | Frederick et al. |
| 6,316,916 B2 | 11/2001 | Bohne |
| 6,319,061 B1 | 11/2001 | Chen et al. |
| 6,322,396 B1 | 11/2001 | Kuan |
| 6,344,727 B1 | 2/2002 | Desai et al. |
| 6,353,894 B1 | 3/2002 | Pione |
| 6,354,713 B1 | 3/2002 | Leifer et al. |
| 6,358,089 B1 | 3/2002 | Kuroda et al. |
| 6,372,974 B1 | 4/2002 | Gross et al. |
| 6,385,596 B1 | 5/2002 | Wiser et al. |
| 6,394,905 B1 | 5/2002 | Takeda et al. |
| 6,429,879 B1 * | 8/2002 | Sturgeon et al. ............ 715/723 |
| 6,431,915 B1 | 8/2002 | Ko |
| 6,453,371 B1 | 9/2002 | Hampson et al. |
| 6,454,592 B2 | 9/2002 | Takagi |
| 6,461,173 B1 | 10/2002 | Mizuno et al. |
| 6,464,542 B2 | 10/2002 | Lee |
| 6,468,110 B2 | 10/2002 | Fujino et al. |
| 6,478,603 B1 | 11/2002 | Wu |
| 6,483,428 B1 | 11/2002 | Fish et al. |
| 6,485,328 B1 | 11/2002 | Wu |
| 6,489,751 B2 | 12/2002 | Small et al. |
| 6,505,160 B1 | 1/2003 | Levy et al. |
| 6,524,119 B2 | 2/2003 | Kato et al. |
| 6,558,201 B1 | 5/2003 | Begley et al. |
| 6,577,877 B1 | 6/2003 | Charlier et al. |
| 6,589,076 B1 | 7/2003 | Davis et al. |
| 6,591,085 B1 | 7/2003 | Grady |
| 6,608,264 B1 | 8/2003 | Fouladpour |
| 6,608,399 B2 | 8/2003 | McConnell et al. |
| 6,614,232 B1 | 9/2003 | Mukai |
| 6,616,473 B2 | 9/2003 | Kamata et al. |
| 6,629,197 B1 | 9/2003 | Bhogal et al. |
| 6,642,629 B2 | 11/2003 | DeLeeuw |
| 6,651,138 B2 | 11/2003 | Lai et al. |
| 6,653,813 B2 | 11/2003 | Khatri |
| 6,663,420 B1 | 12/2003 | Xiao |
| 6,665,803 B2 | 12/2003 | Lundsford et al. |
| 6,674,995 B1 | 1/2004 | Meyers et al. |
| 6,697,944 B1 | 2/2004 | Jones et al. |
| 6,724,339 B2 | 4/2004 | Conway et al. |
| 6,725,061 B1 | 4/2004 | Hutchinson, IV et al. |
| 6,728,546 B1 | 4/2004 | Peterson et al. |
| 6,728,729 B1 | 4/2004 | Jawa et al. |
| 6,747,859 B2 | 6/2004 | Walbeck et al. |
| 6,754,468 B1 | 6/2004 | Sieben et al. |
| 6,761,635 B2 | 7/2004 | Hoshino et al. |
| 6,774,939 B1 | 8/2004 | Peng |
| 6,776,626 B2 | 8/2004 | Huang et al. |
| 6,776,660 B2 | 8/2004 | Kubota et al. |
| 6,776,665 B2 | 8/2004 | Huang |
| 6,799,226 B1 | 9/2004 | Robbin et al. |
| 6,801,964 B1 | 10/2004 | Mahdavi |
| 6,813,528 B1 | 11/2004 | Yang |
| 6,816,376 B2 | 11/2004 | Bright et al. |
| 6,830,160 B2 | 12/2004 | Risolia |
| 6,859,538 B1 | 2/2005 | Voltz |
| 6,859,854 B2 | 2/2005 | Kwong |
| 6,879,843 B1 | 4/2005 | Kim |
| 6,931,456 B2 | 8/2005 | Payne et al. |
| 6,939,177 B2 | 9/2005 | Kato et al. |
| 6,991,483 B1 | 1/2006 | Milan et al. |
| 7,004,787 B2 | 2/2006 | Milan |
| 7,050,783 B2 | 5/2006 | Curtiss et al. |
| 7,054,888 B2 | 5/2006 | LaChapelle et al. |
| 7,062,261 B2 | 6/2006 | Goldstein et al. |
| 7,108,560 B1 | 9/2006 | Chou et al. |
| 7,127,678 B2 | 10/2006 | Bhesania et al. |
| 7,127,879 B2 | 10/2006 | Zhu et al. |
| 7,167,112 B2 | 1/2007 | Anderson et al. |
| 7,167,935 B2 | 1/2007 | Hellberg |
| 7,187,947 B1 | 3/2007 | White et al. |
| 7,215,042 B2 | 5/2007 | Yan |
| 7,281,214 B2 * | 10/2007 | Fadell ........................ 715/745 |
| 7,293,122 B1 * | 11/2007 | Schubert et al. ............... 710/62 |
| 7,293,227 B2 | 11/2007 | Plastina et al. |
| 7,299,304 B2 | 11/2007 | Saint-Hilaire et al. |
| 7,303,282 B2 | 12/2007 | Dwyer et al. |
| 7,304,685 B2 * | 12/2007 | Park et al. .................... 348/556 |
| 7,305,506 B1 * | 12/2007 | Lydon et al. ................. 710/105 |
| 7,441,062 B2 | 10/2008 | Novotney et al. |
| 7,444,388 B1 | 10/2008 | Svendsen |
| 7,454,019 B2 | 11/2008 | Williams |
| 2001/0003205 A1 | 6/2001 | Gilbert |
| 2001/0005641 A1 | 6/2001 | Matsumoto et al. |
| 2001/0006884 A1 | 7/2001 | Matsumoto |
| 2002/0002035 A1 | 1/2002 | Sim et al. |
| 2002/0010759 A1 | 1/2002 | Hitson et al. |
| 2002/0029303 A1 | 3/2002 | Nguyen |
| 2002/0065074 A1 | 5/2002 | Cohn et al. |
| 2002/0068610 A1 | 6/2002 | Anvekar et al. |
| 2002/0072390 A1 | 6/2002 | Uchiyama |
| 2002/0103008 A1 | 8/2002 | Rahn et al. |

| | | |
|---|---|---|
| 2002/0105861 A1 | 8/2002 | Leapman |
| 2002/0108108 A1* | 8/2002 | Akaiwa et al. ............... 725/30 |
| 2002/0115480 A1 | 8/2002 | Huang |
| 2002/0116533 A1 | 8/2002 | Holliman et al. |
| 2002/0132651 A1 | 9/2002 | Jinnouchi |
| 2002/0151327 A1 | 10/2002 | Levitt |
| 2002/0152874 A1 | 10/2002 | Vilcauskas et al. |
| 2002/0156546 A1 | 10/2002 | Ramaswamy |
| 2002/0156949 A1 | 10/2002 | Kubo et al. |
| 2002/0173273 A1 | 11/2002 | Spurgat et al. |
| 2002/0174269 A1 | 11/2002 | Spurgat et al. |
| 2002/0194621 A1 | 12/2002 | Tran et al. |
| 2003/0004934 A1* | 1/2003 | Qian ............................. 707/3 |
| 2003/0011608 A1 | 1/2003 | Wada |
| 2003/0028664 A1 | 2/2003 | Tan et al. |
| 2003/0041206 A1 | 2/2003 | Dickie |
| 2003/0059022 A1 | 3/2003 | Nebiker et al. |
| 2003/0067741 A1 | 4/2003 | Alfonso et al. |
| 2003/0073432 A1 | 4/2003 | Meade |
| 2003/0079038 A1 | 4/2003 | Robbin et al. |
| 2003/0090998 A1 | 5/2003 | Lee et al. |
| 2003/0097379 A1 | 5/2003 | Ireton |
| 2003/0110403 A1 | 6/2003 | Crutchfield et al. |
| 2003/0151621 A1* | 8/2003 | McEvilly et al. ............ 345/744 |
| 2003/0172209 A1 | 9/2003 | Liu et al. |
| 2003/0185395 A1 | 10/2003 | Lee et al. |
| 2003/0198015 A1 | 10/2003 | Vogt |
| 2003/0220988 A1 | 11/2003 | Hymel |
| 2003/0237043 A1 | 12/2003 | Novak et al. |
| 2004/0003300 A1 | 1/2004 | Malueg et al. |
| 2004/0019497 A1 | 1/2004 | Volk et al. |
| 2004/0039860 A1 | 2/2004 | Mills et al. |
| 2004/0048569 A1 | 3/2004 | Kawamura |
| 2004/0090998 A1 | 5/2004 | Chen |
| 2004/0103223 A1 | 5/2004 | Gabehart et al. |
| 2004/0116005 A1 | 6/2004 | Choi |
| 2004/0162029 A1 | 8/2004 | Grady |
| 2004/0186935 A1 | 9/2004 | Bel et al. |
| 2004/0194154 A1 | 9/2004 | Meadors et al. |
| 2004/0198436 A1 | 10/2004 | Alden |
| 2004/0224638 A1* | 11/2004 | Fadell et al. ............... 455/66.1 |
| 2004/0235339 A1 | 11/2004 | Sato et al. |
| 2004/0249994 A1 | 12/2004 | Shapiro et al. |
| 2004/0252966 A1* | 12/2004 | Holloway et al. ............ 386/46 |
| 2004/0267812 A1 | 12/2004 | Harris et al. |
| 2004/0267825 A1 | 12/2004 | Novak et al. |
| 2005/0014119 A1 | 1/2005 | Rudakov |
| 2005/0014531 A1 | 1/2005 | Findikli |
| 2005/0014536 A1 | 1/2005 | Grady |
| 2005/0015355 A1 | 1/2005 | Heller et al. |
| 2005/0022212 A1 | 1/2005 | Bowen |
| 2005/0149213 A1 | 7/2005 | Guzak et al. |
| 2005/0181756 A1 | 8/2005 | Lin |
| 2005/0207726 A1* | 9/2005 | Chen .......................... 386/46 |
| 2005/0239333 A1 | 10/2005 | Watanabe et al. |
| 2005/0240705 A1 | 10/2005 | Novotney et al. |
| 2005/0281185 A1 | 12/2005 | Kawasaki |
| 2006/0015826 A1* | 1/2006 | Shiozawa et al. ........... 715/864 |
| 2006/0031545 A1* | 2/2006 | Manders et al. ............ 709/230 |
| 2006/0088228 A1 | 4/2006 | Marriott et al. |
| 2006/0156415 A1 | 7/2006 | Rubinstein et al. |
| 2006/0161621 A1 | 7/2006 | Rosenberg |
| 2006/0163358 A1 | 7/2006 | Biderman |
| 2006/0184456 A1 | 8/2006 | de Janasz |
| 2006/0188237 A1 | 8/2006 | Watanabe et al. |
| 2006/0224620 A1 | 10/2006 | Silverman et al. |
| 2006/0236245 A1* | 10/2006 | Agarwal et al. ............ 715/716 |
| 2006/0247851 A1 | 11/2006 | Morris |
| 2006/0258289 A1 | 11/2006 | Dua |
| 2006/0294209 A1* | 12/2006 | Rosenbloom et al. ....... 709/220 |
| 2007/0018947 A1 | 1/2007 | Toro-Lira |
| 2007/0056012 A1 | 3/2007 | Kwon et al. |
| 2007/0056013 A1 | 3/2007 | Duncan |
| 2007/0070856 A1 | 3/2007 | Tebele |
| 2007/0080823 A1 | 4/2007 | Fu et al. |
| 2007/0083814 A1 | 4/2007 | Wilbrink et al. |
| 2007/0086724 A1 | 4/2007 | Grady et al. |
| 2007/0106760 A1 | 5/2007 | Houh et al. |
| 2007/0173197 A1 | 7/2007 | Hsiung |
| 2007/0173294 A1 | 7/2007 | Hsiung |
| 2007/0206827 A1 | 9/2007 | Tupman et al. |
| 2007/0226384 A1 | 9/2007 | Robbin et al. |
| 2007/0236482 A1* | 10/2007 | Proctor et al. ............... 345/204 |
| 2007/0247794 A1 | 10/2007 | Jaffe et al. |

FOREIGN PATENT DOCUMENTS

| | | |
|---|---|---|
| EP | 1367734 A1 | 3/2003 |
| EP | 1594319 A | 11/2004 |
| EP | 1498899 A | 1/2005 |
| EP | 1672613 A2 | 6/2006 |
| GB | 2405718 A | 3/2005 |
| GB | 2454406 A | 9/2007 |
| JP | 2002/203641 | 9/1991 |
| JP | 07/176351 | 7/1995 |
| JP | 10/321302 | 4/1998 |
| JP | 10/334993 | 12/1998 |
| JP | 2003/032351 | 5/1999 |
| JP | 11/288420 | 10/1999 |
| JP | 2003/274386 | 7/2000 |
| JP | 2000/214953 | 8/2000 |
| JP | 2000/223215 | 8/2000 |
| JP | 2000/223216 | 8/2000 |
| JP | 2000/223218 | 8/2000 |
| JP | 2003/17165 | 10/2000 |
| JP | 2001/035603 | 2/2001 |
| JP | 2001/069165 A | 3/2001 |
| JP | 2001/196133 | 7/2001 |
| JP | 2001/230021 | 8/2001 |
| JP | 2001/332350 | 11/2001 |
| JP | 2002/025720 | 1/2002 |
| JP | 2002 245719 | 8/2002 |
| JP | 2002/252566 | 12/2002 |
| JP | 2002/342659 | 1/2003 |
| JP | 3090747 U | 1/2003 |
| JP | 2002/374447 | 9/2003 |
| WO | WO 02/049314 | 6/2002 |
| WO | WO 99/026330 | 6/2002 |
| WO | WO 00/039907 | 5/2003 |
| WO | WO 00/060450 | 5/2003 |
| WO | WO 03/036541 A1 | 5/2003 |
| WO | WO 03/036957 A1 | 5/2003 |
| WO | WO 03/073688 | 9/2003 |
| WO | WO 2004/084413 | 9/2004 |
| WO | WO 2004/112311 A | 12/2004 |
| WO | WO 2005/119463 A | 12/2005 |

OTHER PUBLICATIONS iPod Classic User's Guide, acquired from apple.com, 2002; 44 pages.*
iPod nano Features Gude, acquired from apple.com, 2008; 72 pages.*
iPod touch User's Guide, acquired from apple.com, 2008, 120 pages.*
Microsoft, "Media Transport Protocol limplementation Details", 2005, 18 pages.*
Altec Lansing, "inMOTION Users Guide," Corp. Headquarters, 535 Rte.6 & 209, Milford, PA 18337.
"ipodDock/iPod Cradle," www.bookendzdocks.com/bookendz/dock_cradle.htm, downloaded Feb. 27, 2003.
Lewis, Peter, "On Technology." *Fortune Magazine*, Dec. 9, 2002.
"Neuros MP3 Digital Audio Computer," www.neurosaudio.com, downloaded Apr. 9, 2003

Anonymous: "Future of Digital Music in Windows," Microsoft Windows Hardware Developer Central Archive, [Online] Dec. 4, 2001 URL:http://www.microsoft.com/whdc/archive/digitaudio.mspx> [retrieved on Jan. 15, 2008].

Anonymous: "Introduction to Digital Audio," Microsoft Windows Hardware Developer Central Archive, [Online] Dec. 4, 2001 URL:http://www.microsoft.com/whdc/archive/digitaudio.mspx> [retrieved on Jan. 15, 2008].

Anonymous; "Windows and Red Book Audio" Micrsoft Windows Hardware Developer Central Archive, [Online] Dec. 4, 2001 URL:http://www.microsoft.com/whdc/archive/Dmfuture.mspx> [retrieved Jan. 15, 2008].

Belkin iPod Voice Recorder, Product Specification Sheet. printed Jun. 16, 2004.

Bindra, Ashok, "Standard Turns Monitor into I/O Hub," *Electronic Engineering Times*, vol. 918, Sep. 6, 1996, p. 14.

Brentrup, "Introduction to Public Key Cryptography Demystified," Campus Technology, printed from http://www.campus-technology.com/article.asp?id=7626 on Oct. 6, 2004.

"Cables to Go," download Oct. 16, 2001 http://www.cablestogo.com/product.asp?cat%5Fid=601&sku=27028.

Crawford et al., "Sample rate conversion and bit rate reduction in the studio," IEE Colloquim on Digital Audio Signal Processing, May 22, 1991, pgs. 8-1.

Derman, Glenda, "Monitors Make Net Connections" *Electronic Engineering Times*, vol. 933, 1996, pp. 60 and 69.

"ExpressBus™ F5UOI 0 User Guide Packing Checklist", Belkin Components.

"FireWire", downloaded Oct. 16, 2001, si_wyg:/_/4_2/http://developer.apple.comlhardwarelFire_Wire.

"Fire Wire Connector", downloaded Oct. 16, 2001, wysiwyg:/176/ http://developer.apple.com/...es/Macintosh_CPUs_G3/ibook/ibook-27.html.

" FireWire Finally Comes Home", Charles Severance, Michigan State University.

Fried, "FireWire poised to become ubiquitous", downloaded Oct. 16, 2001, CNET News.com, 1394 Trade Association: Press, wysiwyg:/132/http:/_113_9t4a.org/Press/200_1_Press/august!8.2_7.b.html.

"How to Connect Your Computer, PC Hardware", downloaded Oct. 16, 2001, http://www.scar.utoronto.ca!~ccweb/faculty/connecthowto.html.

"IEEE 1394/USB Comparison", downloaded Oct. 16, 2001, www.genitech.com.auILIBRARY/TechSupportiinfobits/firewirevsusb.htm.

Lambert, M., "Digital Audio Interfaces," Journal of the Audio Engineering Society, Audio Engineering Society, New York, NY vol. 38, No. 9, (Sep. 1, 1990), pp. 681-684, 686, 68 XP000175146 ISSN: 1549-4950 figures 9, 10.

"Making USB Work", downloaded Oct. 16, 2001, PC Magazine: PC Tech wysiwyg:/_155/http://www.zdnet.com/pcmag/pctech/content!18/04/tu_1804.001.html.

Menezes et al., "Handbook of Applied Cryptography," Identification and Entity Authentication, pp. 385-424.

"MVP Music Profile Specification Revision 1.00" Internet Citation [online] (Jan. 7, 2004) URL:http//www.osta.org/mpv/public/specs/MPVMusic-Prof-Spec-1.00.pdf> [retrieved Jun. 20, 2006] the whole document.

Networking Tech Note, "1394 Standards and Specifications," 3 pgs.

"PMC FW2 IEEE1394 FireWire Controller", downloaded Oct. 16, 2001, http://www.bvmltd.co.uk/PMCfw2ds.html.

Sinitsyn, Alexander, "Synchronization Framework For Personal Mobile Servers," *Pervasive Computing and Communications Workshops* (PERCOMW'04) Proceedings of the Second IEEE Annual Conference, Piscataway, NJ, USA, IEEE, Mar. 14, 2004, pp. 208-212.

Teener, "Understanding Fire Wire: The IEEE 1394 Standards and Specifications", downloaded Oct. 16, 2001, wysiwyg:119/http:1_Iwww.chipcenter.com/networking/ieee_1394/main.html.

"The Authoritative Dictionary of IEEE Standards Terms, Seventh Edition", Pbulished by Standards Information Network, IEEE Press.

"Why FireWire is Hot!Hot!Hot!", downloaded Oct. 16, 2001, "Impact.Fire Wire. SideBar" http://www.vxm.com/21R.35.html.

PCT Search Report PCT/US2007/078072.

Fried, "New Fire Wire to blaze faster trail", downloaded Oct. 16, 2001, CNET News.com, http://news.cnet.com/news/0-l006-200-6021210.html.

"Introduction to Public Key Cryptography," Oct. 9, 1998, printed from http://developer.netscape.com/docs/manuals/security/pkin/contents.htm on Oct. 6, 2004.

Whittle, "Public Key Authentication Framework: Tutorial," First Principles Consulting, Jun 2, 1996.

"Universal Serial Bus Specification—Rev 2.0," Chapter 6, Compaq Hewlett-Packard, Apr. 27, 2000, pp. 85, 99-100.

"Universal Serial Bus Specification—Rev 2.0," XP002474828, Chapter 9, USB Device Framework, pp. 239-274.

MAXTech Technology Ltd., CES 2000/Las Vegas, Jan. 6-9, 2000, [on line], [retrieved on Sep. 26, 2008]. Retrieved from the Internet <URL: http://web.archive.org/web/20000930170634/www.maxtech.com.hk/t-details.htm>. 2 pages.

MAXTech Technology Ltd., CES 2000/Las Vegas, Jan. 6-9, 2000, [online], [retrieved on Sep. 23, 2008]. Retrieved from the Internet <URL: http://web.archive.org/web/20010223230441/www.maxtech.com.hk/g-p06.htm>. 2 pages.

International Preliminary Report on Patentability dated Mar. 26, 2009, 9 pages.

\* cited by examiner

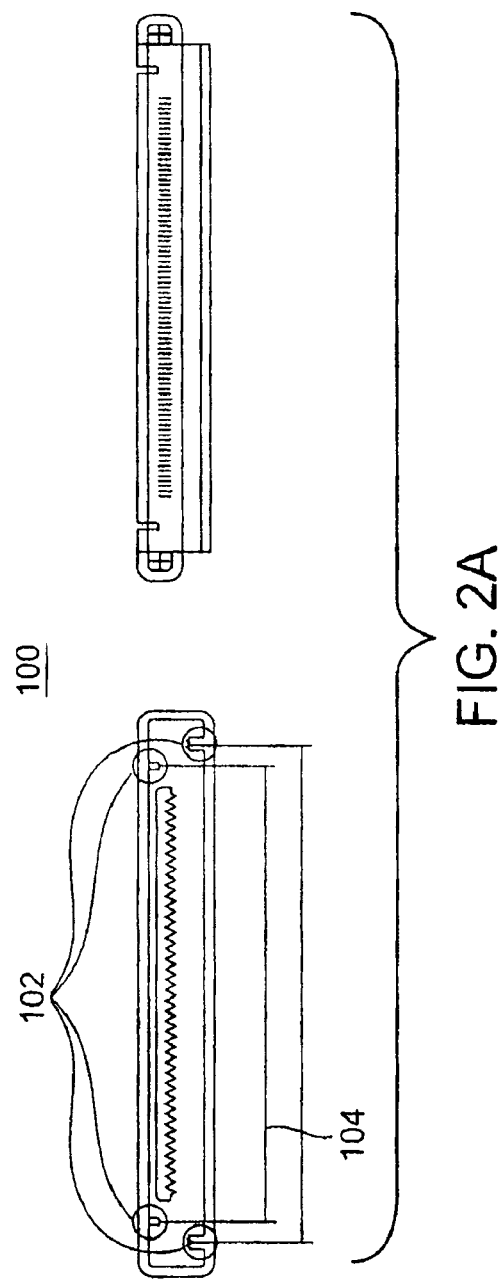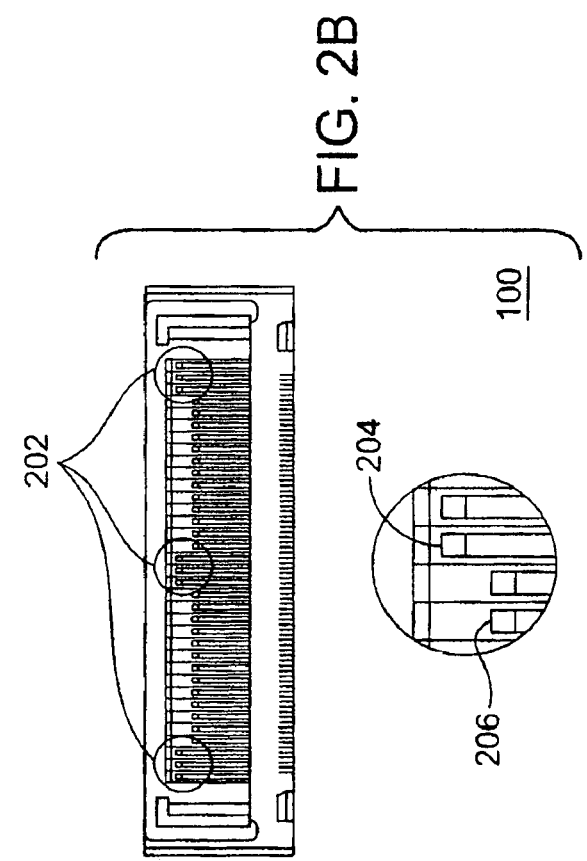

| Pin | Signal Name | I/O | Function |
|---|---|---|---|
| 1 | DGND | I | Digital Ground |
| 2 | DGND | I | Digital Ground |
| 3 | TPA+ | I/O | Firewire signal |
| 4 | USB D+ | I/O | USB signal |
| 5 | TPA- | I/O | Firewire signal |
| 6 | USB D- | I/O | USB signal |
| 7 | TPB+ | I/O | Firewire signal |
| 8 | USB PWR | I | USB power is NOT for powering; only to detect USB host |
| 9 | TPB- | I/O | Firewire signal |
| 10 | Accessory Identify | I | Pull down in dock to notify iPod of specific device |
| 11 | F/W PWR+ | I | Firewire and charger input power (8V to 30V dc) |
| 12 | F/W PWR+ | I | Firewire and charger input power (8V to 30V dc) |
| 13 | ACCESSORY PWR(3V3) | O | 3.3V output from iPod. Current limited to 100mA |
| 14 | Reserved | | |
| 15 | DGND | GND | Digital ground in iPod |
| 16 | DGND | GND | Digital ground in iPod |
| 17 | Reserved | | |
| 18 | Dock Tx | I | Serial protocol (Data to iPod) |
| 19 | Dock Rx | O | Serial protocol (Data from iPod) |
| 20 | Accessory Defect | I/O | |
| 21 | S Video Y | O | Luminance Component |
| 22 | S Video C | O | Chrominance Component |
| 23 | Video Composite | O | Composite Signal |
| 24 | Remote Sense | I | Detect Remote |
| 25 | LINE-IN L | I | Line level input to the iPod for the left channel |
| 26 | LINE-IN R | I | Line level input to the iPod for the right channel |
| 27 | LINE-OUT L | O | Line level output to the iPod for the left channel |
| 28 | LINE-OUT R | O | Line level output to the iPod for the right channel |
| 29 | Audio Return | GND | Audio return - Signal, never to be grounded inside accessory |
| 30 | DGND | GND | Digital ground iPod |
| 31 | Chassis | | Chassis ground for connector shell |
| 32 | Chassis | | Chassis ground for connector shell |

FIG. 4A

| Pin | Signal Name | I/O | Function |
|---|---|---|---|
| 1 | Audio. Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Composite Video | O | Video Signal |
| 6 | Accessory 3.3 V | O | 3.3V Accessory power 100mA max |
| 7 | Tx | O | Serial protocol (Data from iPod to Device) |
| 8 | Rx | I | Serial protocol (Data from iPod from Device) |
| 9 | D GND | GND | Digital ground for accessory |

FIG. 4B

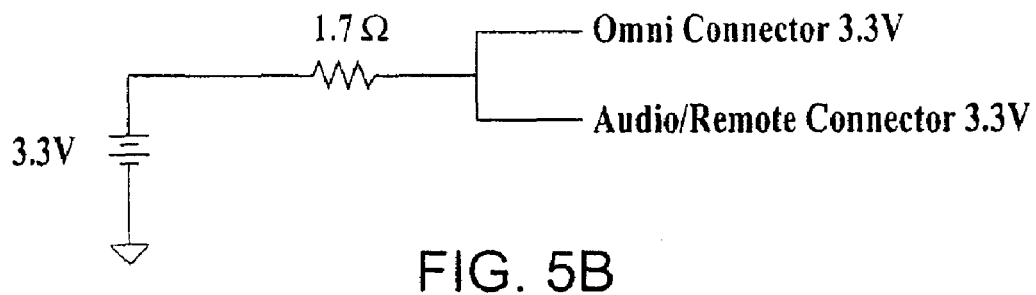

FIG. 5B

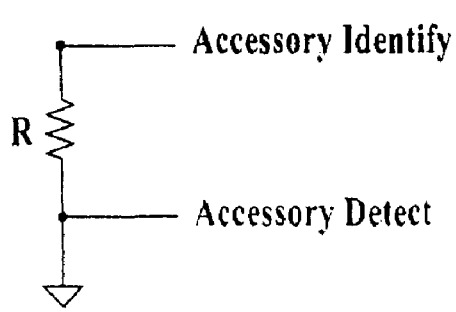

FIG. 5C

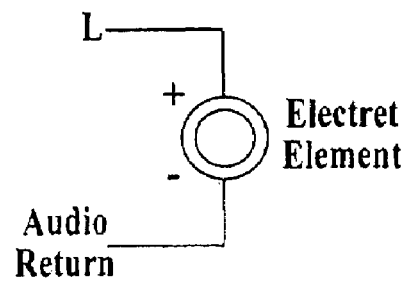

FIG. 5D

METHOD AND SYSTEM FOR CONTROLLING VIDEO SELECTION AND PLAYBACK IN A PORTABLE MEDIA PLAYER

CROSS-REFERENCES TO RELATED APPLICATIONS

This application is related to co-pending U.S. patent application Ser. No. 10/833,689, entitled "Connector Interface System for a Multi-Communication Device", filed on Apr. 27, 2004, and assigned to the assignee of the present application, which is incorporated by reference herein.

This application is related to U.S. patent application Ser. No. 11/519,386, entitled "Method and System for Controlling an Accessory Having a Tuner", filed on even date herewith, assigned to the assignee of the present application which is incorporated by reference herein.

This application is related to U.S. patent application Ser. No. 11/519,278, entitled "Method and System for Controlling Power Provided to an Accessory", filed on even date herewith, assigned to the assignee of the present application which is incorporated by reference herein.

FIELD OF THE INVENTION

The present invention relates generally to electrical devices and more particularly to electrical devices such as portable media players that communicate with accessory devices.

BACKGROUND OF THE INVENTION

A portable media player stores media assets, such as audio tracks, video tracks or photos that can be played or displayed on the portable media player. One example of a portable media player is the iPod® portable media player, which is available from Apple Inc. of Cupertino, Calif. Often, a portable media player acquires its media assets from a host computer that serves to enable a user to manage media assets. As an example, the host computer can execute a media management application to manage media assets. One example of a media management application is iTunes®, version 6.0, produced by Apple Inc.

A portable media player typically includes one or more connectors or ports that can be used to interface to the portable media player. For example, the connector or port can enable the portable media player to couple to a host computer, be inserted into a docking system, or receive an accessory device. There are today many different types of accessory devices that can interconnect to the portable media player. For example, a remote control can be connected to the connector or port to allow the user to remotely control the portable media player. As another example, an automobile can include a connector and the portable media player can be inserted onto the connector such that an automobile media system can interact with the portable media player, thereby allowing the media content on the portable media player to be played within the automobile. In another example, a digital camera can be connected to the portable media player to download images and the like. In another example, content (either audio, video or photos) can be provided from a host to the portable media player which can then play the content.

Accordingly, it is desirable for the portable media player to be able to effectively provide ways to optimize the interaction between a portable media player and an accessory. The present invention addresses such a need.

SUMMARY OF THE INVENTION

A method and system for controlling video selection and playback is disclosed. In a first aspect, a method and system for providing video settings for a portable media player comprise obtaining preferences of the portable media player; returning a current setting of the portable media player and setting appropriate preferences within the portable media player. The method and system includes enabling the preferences of the portable media player.

In a second aspect, a method and system for use with a portable media player comprise providing an audio menu and a video menu via the portable media player and selecting the video menu. The method and system includes selecting the video capable tracks of the portable media player utilizing a command.

In a third aspect, a method and system for navigating a video control within a portable media player comprise providing a video hierarchy and selecting a media kind from the video hierarchy utilizing at least one command. The method and system includes selecting a category of the media kind until a desired video track is obtained utilizing at least one command.

BRIEF DESCRIPTION OF THE DRAWINGS

FIGS. 2A and 2B illustrate a docking connector in accordance with the present invention.

FIG. 4A illustrates the connector pin designations for the docking connector.

FIG. 4B illustrates the connection pin designations for the remote connector.

FIG. 5B illustrates a reference schematic diagram for an accessory power source.

FIG. 5C illustrates a reference schematic diagram for a system for detecting and identifying accessories for the docking connector.

FIG. 5D is a reference schematic of an electret microphone that may be within the remote connector.

DETAILED DESCRIPTION OF THE INVENTION

The present invention relates generally to electrical devices and more particularly to electrical devices such as portable media players that communicate with accessory devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A method and system in accordance with the present invention provides a system that allows a portable media player to control settings of portable media player when receiving video from an accessory, to control playback of the portable media player and to provide for navigation between video tracks in a hierarchical fashion. In so doing, a portable media player can then utilize this information to allow for the maximum functionality of the accessory when connected to the portable media player. In one embodiment commands are utilized to facilitate communication of this information between the portable media player and the accessory. To describe the features of the present invention in more detail refer now to the following discussion in conjunction with the accompanying Figures.

Figure 1:
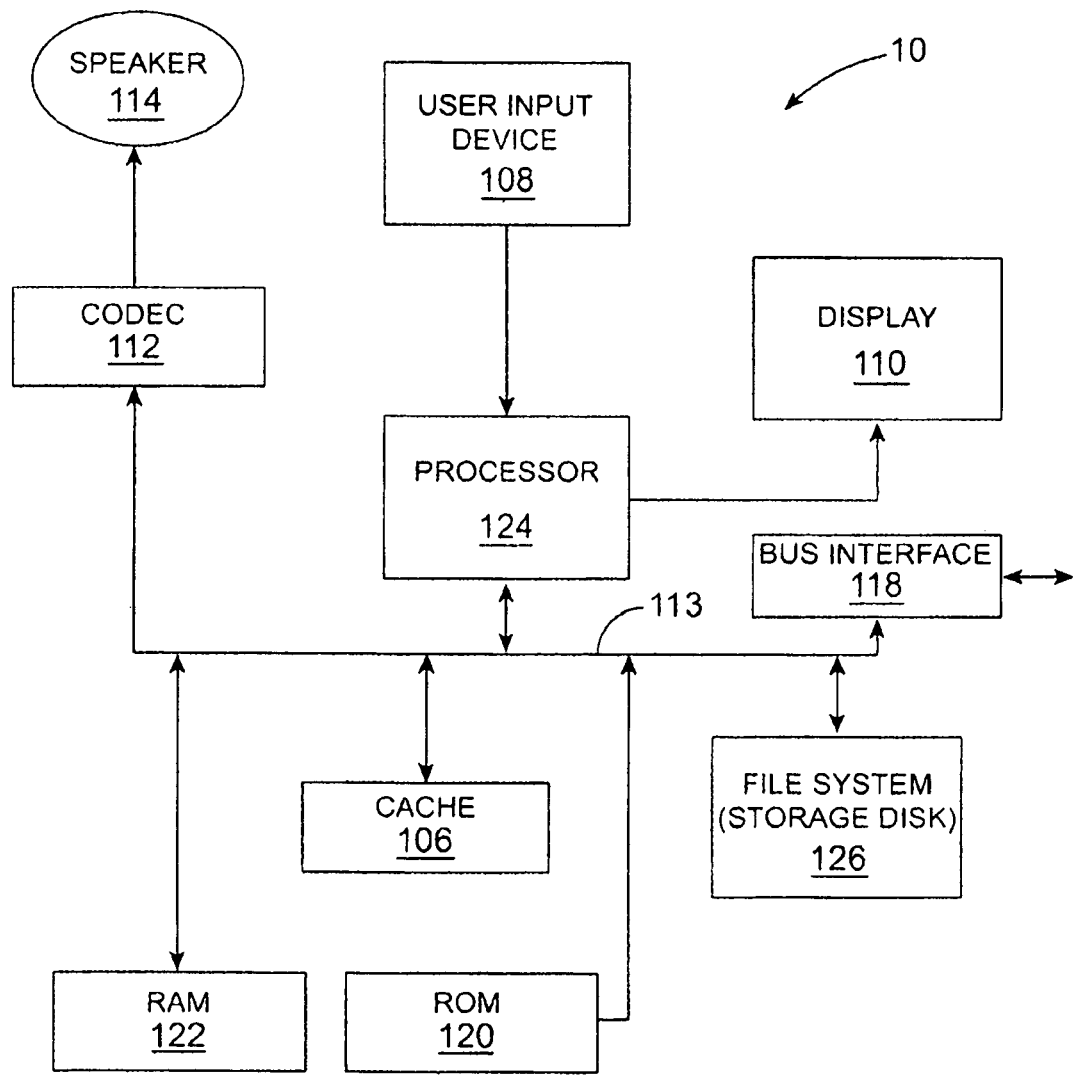
FIG. 1 shows an exemplary portable media player, in accordance with an embodiment of the invention.

FIG. 1 shows a simplified block diagram for an exemplary portable media player 10 in accordance with an embodiment of the invention. The portable media player 10 includes a processor 124 that pertains to a microprocessor or controller for controlling the overall operation of the portable media player 10. The portable media player 10 stores media data pertaining to media assets in a file system 126 and a cache 106. The file system 126 typically provides high capacity storage capability for the portable media player 10. However, to improve access time to the file system 126, the portable media player 10 can also include a cache 106. The cache 106 may be, for example, Random-Access memory (RAM). The relative access time to the cache 106 is substantially shorter than for the file system 126. However, the cache 106 typically does not have the large storage capacity of the file system 126. Further, the file system 126, when active, consumes more power than does the cache 106. The power consumption is particularly important when the portable media player 10 is powered by a battery (not shown). The portable media player 10 also includes additional RAM 122 and a Read-Only Memory (ROM) 120. The ROM 120 can store programs to be executed by the processor 124. The RAM 122 provides volatile data storage, such as for the cache 106.

The portable media player 10 also includes a user input device 108 that allows a user of the portable media player 10 to interact with the portable media player 10. For example, the user input device 108 can take a variety of forms, such as a button, keypad, touch screen, dial, etc. Still further, the portable media player 10 includes a display 110 (screen display) that can be controlled by the processor 124 to display information as well as photos and video tracks to the user. A data bus 113 can facilitate data transfer between at least the file system 126, the cache 106, the processor 124, and other functional blocks. The portable media player 10 also includes a bus interface 116 that couples to a data link 118. The data link 118 allows the portable media player 10 to couple to a host computer that can be a stand alone host computer or part of an interconnected network of computers, such as the Internet or other such distributed systems.

In one embodiment, the portable media player 10 serves to store a plurality of media assets (e.g., songs, videos, photos) in the file system 126. When a user desires to have the portable media player 10 play a particular media item, a list of available media assets is displayed on the display 110. Then, using the user input device 108, a user can select one of the available media assets. The processor 124, upon receiving a selection of a particular media item, such as an audio file, supplies the media data for the particular media item to a coder/decoder (CODEC) 112 via bus 113. The CODEC 112 then produces analog output signals for a speaker 114. The speaker 114 can be a speaker internal to the portable media player 10 or external to the portable media player 10. For example, headphones or earphones that connect to the portable media player 10 would be considered an external speaker. In other applications, media asset files stored on the host computer or in other computers coupled to the host computer by way of the network can be transferred (otherwise referred to as downloaded) to the file system 126 (or the cache 106). These media assets could also be, for example, videos or photos which could be provided to the display 110 via a video processor (not shown) either coupled to or within the processor 124. In this way, the user has available any number and type of media asset files for play by the portable media player 10.

For example, in a particular embodiment, the available media assets are arranged in a hierarchical manner based upon a selected number and type of groupings appropriate to the available media assets. In the case where the portable media player 10 is an MP3 type media player, the available media assets take the form of MP3 files (each of which corresponds to a digitally encoded song or other rendition) stored at least in part in the file system 126. The available media assets (or in this case, songs) can be grouped in any manner deemed appropriate. In one arrangement, the songs can be arranged hierarchically as a list of music genres at a first level, a list of artists associated with each genre at a second level, a list of albums for each artist listed in the second level at a third level, a list of songs for each album listed in the third level at a fourth level, and so on.

A method and system in accordance with the present invention can be utilized with a portable media player and its associated accessory in a variety of environments. One such environment is within a connector interface system that is described in detail hereinbelow. The connector interface system allows for the portable media player and the accessory to communicate utilizing interface signals over at least one of the pins of the connector interface system.

Connector Interface System Overview

To describe the features of the connector interface system in accordance with the present invention in more detail, refer now to the following description in conjunction with the accompanying drawings.

Docking Connector

FIGS. 2A and 2B illustrate a docking connector 100 in accordance with the present invention. Referring first to FIG. 2A, the keying features 102 are of a custom length 104. In addition, a specific key arrangement is used, where one set of keys separated by one length are at the bottom and another set of keys separated by another length are at the top of the connector. The use of this key arrangement prevents noncompliant connectors from being plugged in and potentially causing damage to the device. The connector for power utilizes a Firewire specification for power. The connector includes a first make/last break contact to implement this scheme. FIG. 2B illustrates the first make/last break contact 202 and also illustrates a ground pin 204 and a power pin 206 related to providing an appropriate first make/last break contact. In this example, the ground pin 204 is longer than the power pin 206. Therefore, the ground pin 204 would contact its mating pin in the docking accessory before the power pin 206. Therefore the risk of internal electrical damage to the electronics of the device is minimized. Further details of an exemplary embodiment for the docking connector 100 are described in U.S. Pat. No. 6,776,660 entitled CONNECTOR, which issued on Aug. 17, 2004 and is incorporated herein by reference in its entirety.

In addition, a connector interface system in accordance with the present invention uses both USB and Firewire interfaces as part of the same docking connector alignment, thereby making the design more compatible with different types of interfaces, as will be discussed in detail hereinafter. In so doing, more remote accessories can interface with the portable media player.

Remote Connector

Figure 3A:
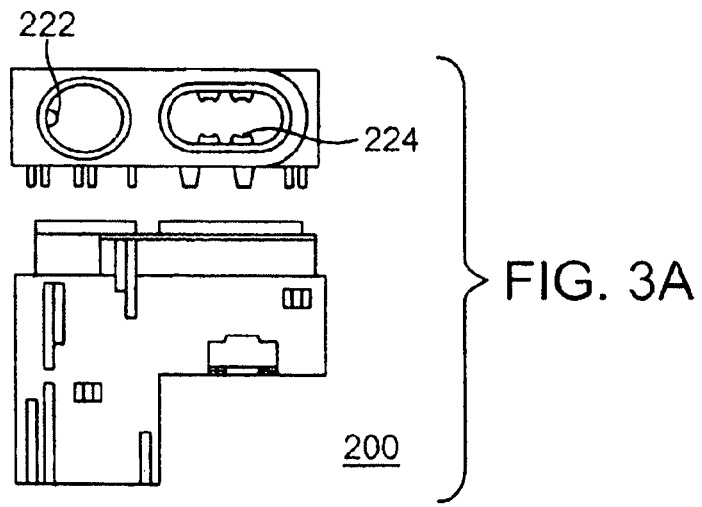
FIG. 3A is a front and top view of a remote connector in accordance with the present invention.
Figure 3B:
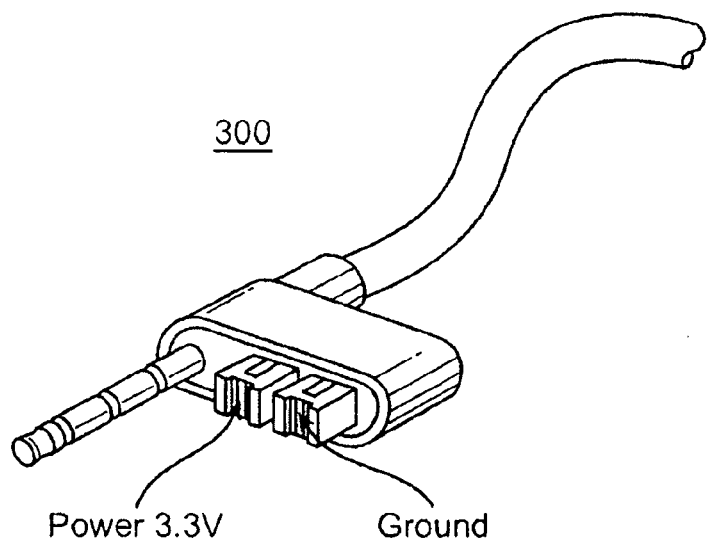
FIG. 3B illustrates a plug to be utilized in the remote connector.
Figure 3C:
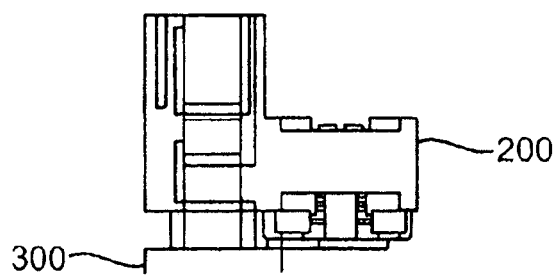
FIG. 3C illustrates the plug inserted into the remote connector.

The connector interface system also includes a remote connector which provides for the ability to output audio and input audio, provides I/O serial protocol, and provides the ability to input video and output video. FIG. 3A is a front and top view of a remote connector 200 in accordance with the present invention. As is seen, the remote connector 200 includes a top headphone receptacle 222, as well as a second receptacle 224 for remote devices. FIG. 3B illustrates a plug 300 to be utilized in the remote connector. The plug 300 allows these features to be provided via the remote connector. FIG. 3C illustrates the plug 300 inserted into the remote connector 200. Heretofore, all these features have not been implemented in a remote connector. Therefore, a standard headphone cable can be plugged in but also special remote control cables, microphone cables and video cables could be utilized with the remote connector.

To describe the features of the connector interface system in more detail, provided below is a functional description of the docking connector, remote connector and a command set in accordance with the present invention.

Docking and Remote Connector Specifications

For an example of the connector pin designations for both the docking connector and for the remote connector for a portable media player such as an iPod device by Apple Inc., refer now to FIGS. 4A and 4B. FIG. 4A illustrates the connector pin designations for the docking connector. FIG. 4B illustrates the connection pin designations for the remote connector.

Docking Connector Specifications

Figure 5A:
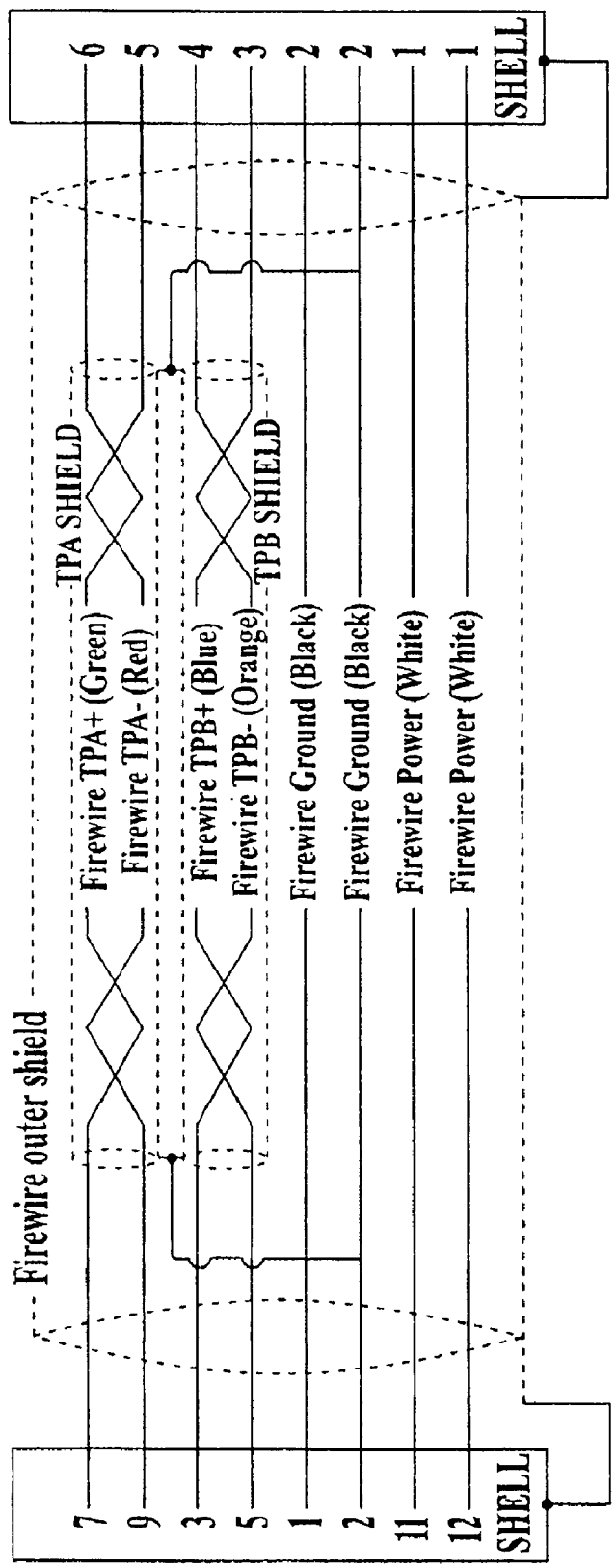
FIG. 5A illustrates a typical FireWire connector interface for the docking connector.

FIG. 5A illustrates a typical Firewire connector interface for the docking connector:
Firewire Power:
a) 8V-30V DC IN
b) 10 W Max
Firewire Signal:
a) Designed to IEEE 1394 A Spec (400 Mb/s)

USB Interface

In one embodiment, the portable media player provides two configurations, or modes, of USB device operation: mass storage and portable media player USB Interface (MPUI). The MPUI allows the portable media player to be controlled using an accessory protocol. What is meant by an accessory protocol is the software component of the media player that communicates with accessories over a given transport layer.

Accessory Power

FIG. 5B illustrates the accessory power source. The portable media player accessory power pin supplies voltages, for example, 3.0 V to 3.3V±5% (2.85 V to 3.465 V) over the docking connector and remote connector (if present). A maximum current is shared between the docking connector and the remote connector.

By default, the portable media player supplies a particular current such as 5 mA. An appropriate software accessory detection system can be employed to turn on high power (for example, up to 100 mA) during active device usage. When devices are inactive, they typically consume less than a predetermined amount of power such as 5 mA current. Accessory power is switched off for a period of, for example, approximately 2 seconds during the powering up of the portable media player. This is done to ensure that accessories are in a known state and can be properly detected. In one embodiment, accessories are responsible for re-identifying themselves after the portable media player transitions accessory power from the off to the on state.

Accessory power is grounded through the Digital Ground (DGND) pins.

FIG. 5C illustrates a reference schematic diagram for a system for detecting and identifying accessories for the docking connector. The system comprises:

a) a resistor (R) to ground that allows the device to determine what type of accessory has been plugged into the docking connector; and b) two identify and detect pins (Accessory Identify (pin 10, FIG. 4A) and Accessory Detect (pin 20, FIG. 4A)).

FIG. 5D is a reference schematic of an electret microphone that is within the remote connector.

Serial Protocol Communication:

For serial protocol communication, two pins are used to communicate to and from the device (Rx (pin 19, FIG. 4A) & Tx (pin 18, FIG. 4A)). Input & Output levels can be, e.g., 0V=Low, 3.3V=High.

Figure 6A:
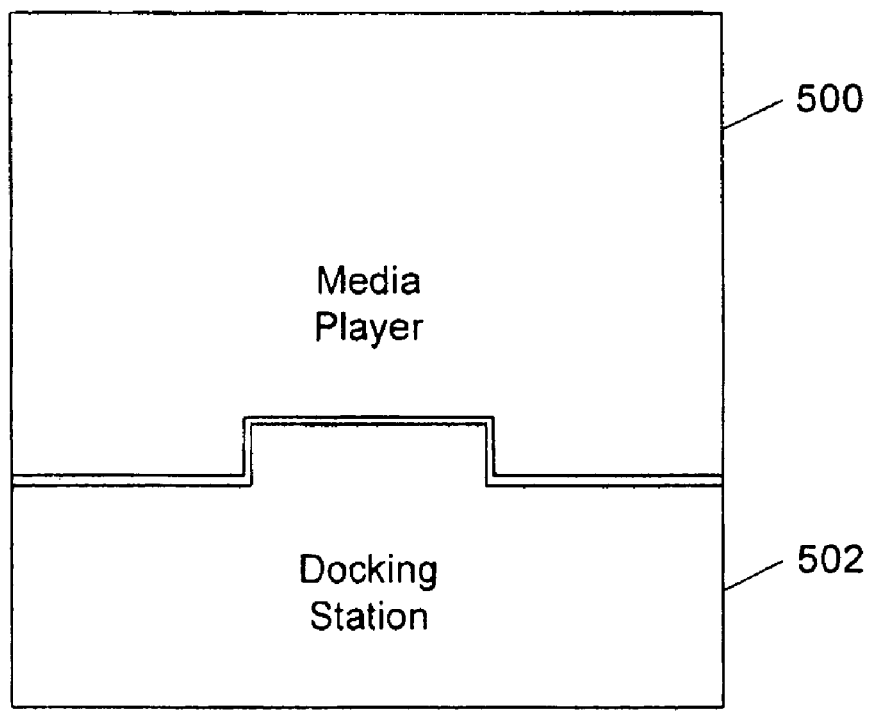
FIG. 6A illustrates a portable media player coupled to a docking station.
Figure 6B:
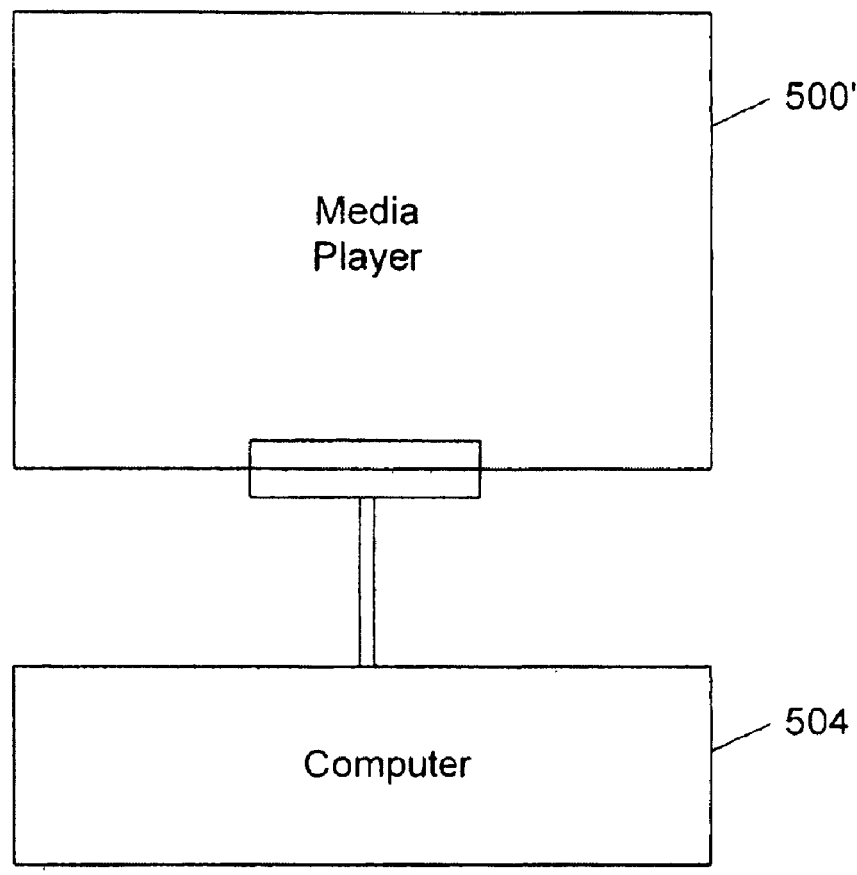
FIG. 6B illustrates the portable media player coupled to a computer.
Figure 6C:
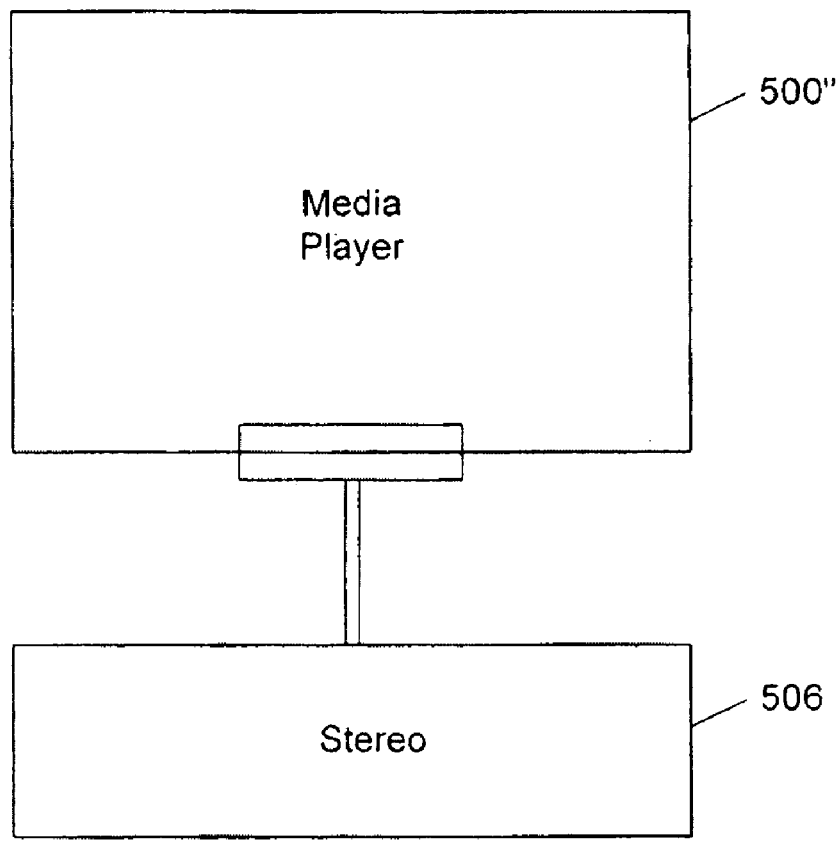
FIG. 6C illustrates the portable media player coupled to a car or home stereo system.
Figure 6D:
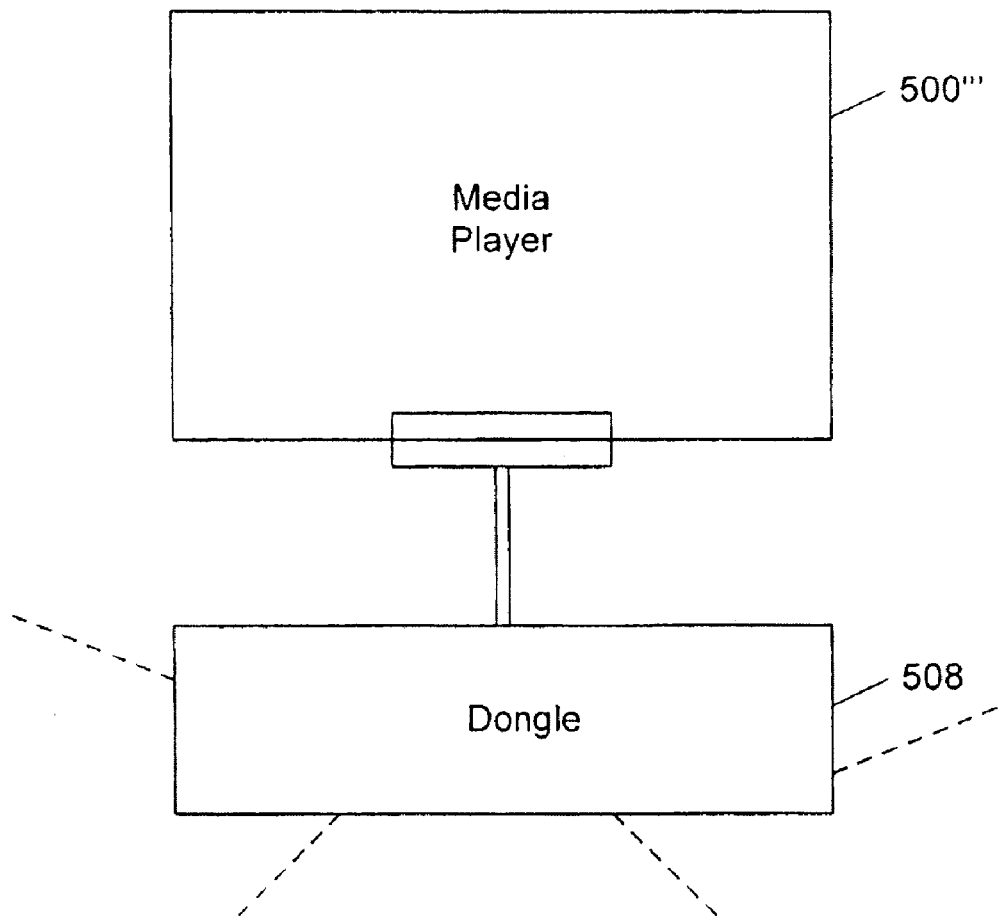
FIG. 6D illustrates the portable media player coupled to a dongle that communicates wirelessly with other accessories.
Figure 6E:
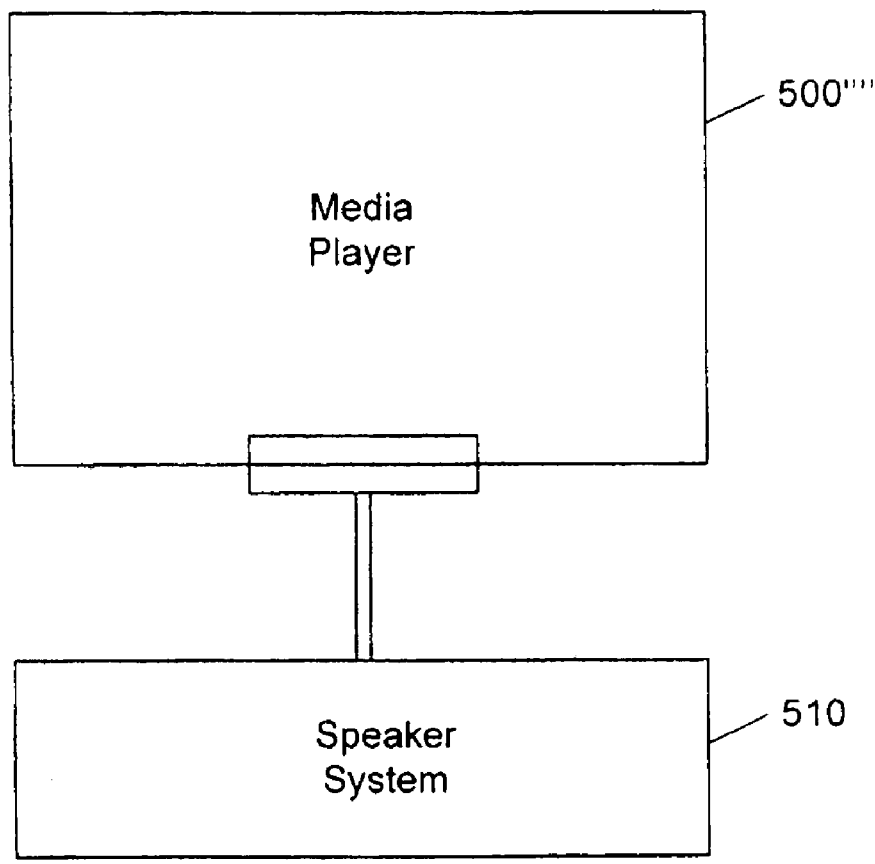
FIG. 6E illustrates the portable media player coupled to a speaker system.

As before mentioned, portable media players connect to a variety of accessories. FIGS. 6A-6E illustrates a portable media player coupled to different accessories. FIG. 6A illustrates a portable media player 500 coupled to a docking station 502. FIG. 6B illustrates the portable media player 500' coupled to a computer 504. FIG. 6C illustrates the portable media player 500" coupled to a car or home stereo system 506. FIG. 6D illustrates the portable media player 500''' coupled to a dongle 508 that communicates wirelessly with other devices. FIG. 6E illustrates the portable media player 500'''' coupled to a speaker system 510. As is seen, what is meant by accessories includes but is not limited to docking stations, chargers, car stereos, microphones, home stereos, computers, speakers, and accessories which communicate wirelessly with other accessories.

An embodiment can utilize a plurality of aspects to effectively play video information on a portable media player. First, the portable media player settings can be controlled. For example, the video output is set, the format used in the portable media player is set or the aspect ratio of the screen can be set. In a second aspect, playback controls are utilized to control the playing of a video. Finally, in a third aspect database navigation of the video selections is provided via a hierarchical system. To describe the features of each of these aspects in more detail refer now to the following discussion in conjunction with the accompanying drawings.

In one embodiment, commands are for accessories that need to control the state of the portable media player, recreate a portion of the portable media player user interface on a remote display, or control the state of the portable media player equalizer. The commands can be used by simple inline-display remotes (remotes that have single-line display and play control buttons) and more complex accessories that have full multi-line graphical displays to show information about the track, artist, or album; current play or pause state; track position; battery; shuffle and time.

Portable Media Player Settings

In one aspect, commands are utilized on a portable media player for video control. The commands for example could be provided via the serial pins (Rx and Tx) of the 30-pin connector shown in FIG. 4A.

Figure 7:
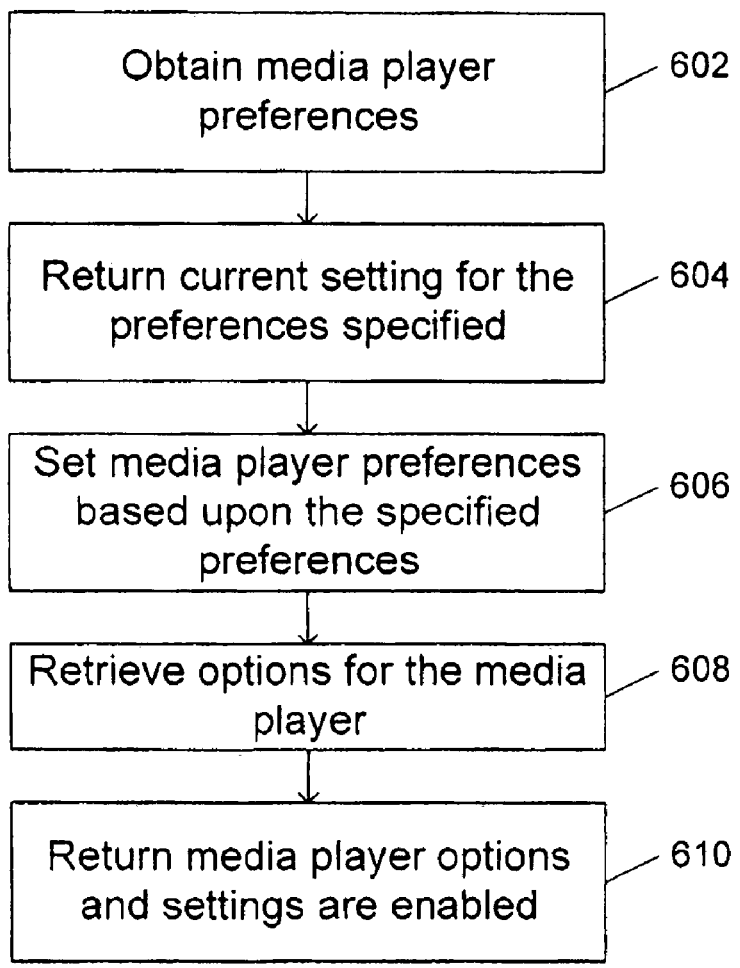
FIG. 7 is a flow chart that illustrates a process for providing the portable media player settings.

FIG. 7 is a flow chart that illustrates a process for providing the portable media player settings. First a command is provided which obtains portable media player preferences, via step 602. In one embodiment there are three values that may be set in the command: off (0), on (1) and "ask" (2). There may be several different preferences for video, for example, screen configuration and video format. In one embodiment there are two values for screen configuration: fullscreen (0) and widescreen (1). In one embodiment, there are two values for the video format, such as: an analog television format by the National Television System Committee (NTSC)(0) and Phase Alternating Line format (PAL) (1).

Next, a command returns the current setting for the preferences specified, via step 604. Thereafter, a command sets appropriate combinations of preference type and values, via step 606. Then a command is utilized to ask the portable media player to retrieve options supported by the portable media player, via step 608. Finally, the portable media player options are returned and the settings on the portable media player are enabled, via step 610. In so doing, video content can be controlled and played.

Video Selection and Playback

Figure 8:
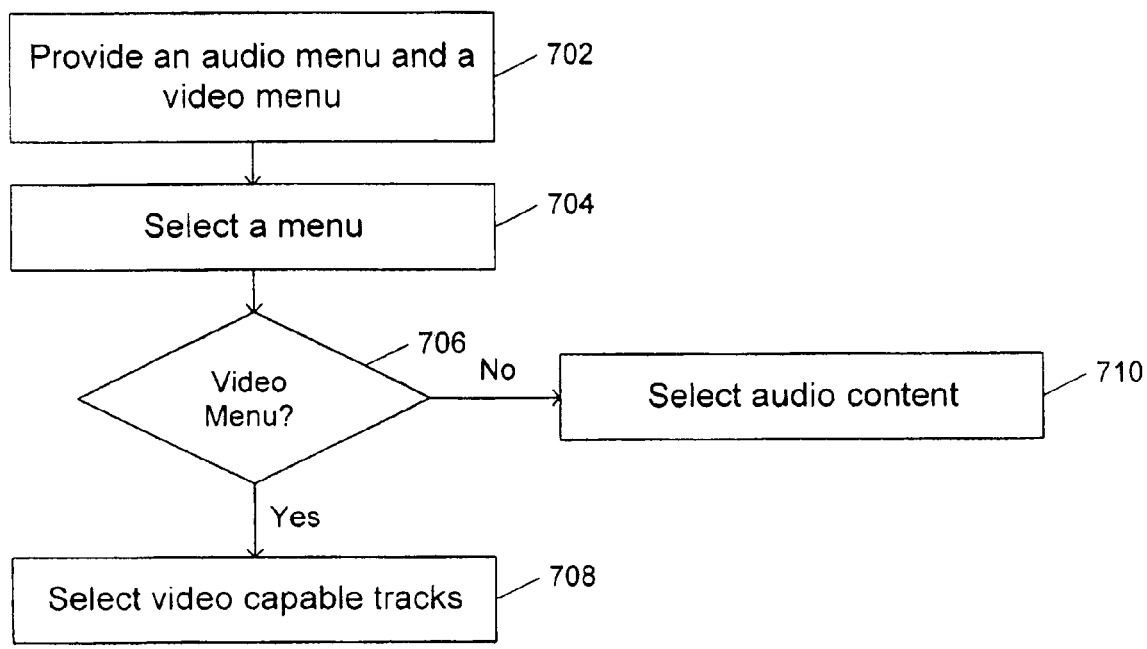
FIG. 8 is a flow chart that illustrates a process for selecting a menu from a portable media player.

Once the settings are enabled, then in a second aspect, video selection and playback is provided. In an embodiment, playing a video will depend on the current user selection. FIG. 8 is a flow chart illustrating a process for selecting a menu from a portable media player. Accordingly, audio and video menus are displayed, via step 702. If the user selects the video menu, then video will be played for video-capable tracks, via step 704. If the user selects the audio menu, then only audio will be played, via step 706.

Database Navigation

Figure 9:
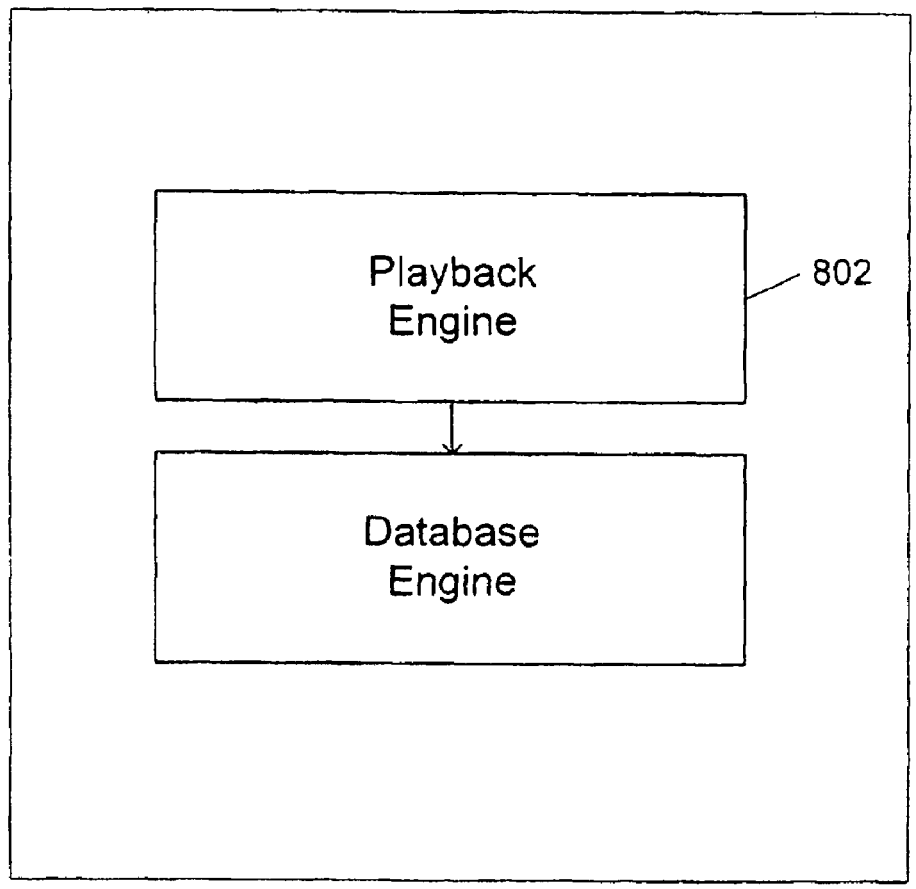
FIG. 9 is a block diagram that illustrates two logical entities in a portable media player that need to be managed while browsing and playing content: a playback and a database engine.

In a third aspect, the database of the portable media player must be navigated to play the appropriate video selection. To describe this feature in more detail, refer now to the following description in conjunction with the accompanying figures. As shown in FIG. 9, in a portable media player 800 there are two logical entities that need to be managed while browsing and playing content: a playback engine 802 and a database engine 804. The following describes those engines and gives an example of command traffic between an accessory and a portable media player.

The Playback Engine

The playback engine 802 is active when the portable media player is in a playback state, such as play, fast forward, and rewind. It has a special play list that is used to determine what track or content item will be played next. A command is used to transfer the currently selected database items to the special play list and start the portable media player at a specified item within that list.

The Database Engine

The database engine 804 can be manipulated remotely and allows groups of content items to be selected, independently of the playback engine 802. This allows the user to listen to an existing track or playlist while checking the portable media player database for another selection. Once a different database selection is made, the user selection (the track or content playlist) is sent to the playback engine 802.

Database Category Hierarchies

The database engine 804 uses categories to classify records stored in the database. Possible categories are playlist, genre, artist, album, track, composer and audiobook. A list of records can be assembled, based on the various selected categories, to create a user list of records (a playlist).

In one embodiment, the database categories have a hierarchy by which records are sorted and retrieved. This category hierarchy has an impact on the order in which records should be selected. For example, if a low category, such as album, is selected first, followed by a higher relative category such as genre, the album selection is invalidated and is ignored. When creating a new set of database selections, the accessory should begin by resetting all database selections, using the a command, and selecting the desired database categories from highest to lowest relative category.

Figure 10:
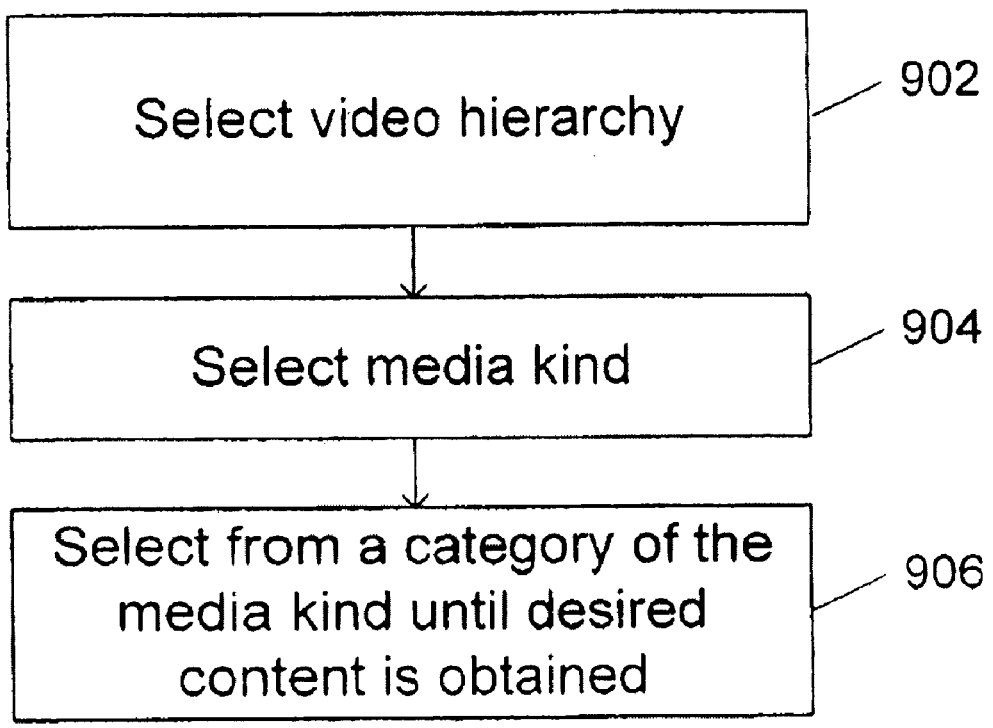
FIG. 10 is a flow chart that illustrates database navigation in a portable media player.

FIG. 10 is a flow chart illustrating database navigation in a portable media player in accordance with the present invention. In an embodiment, a command is utilized to select between audio and video hierarchies via step 902. For example, an additional byte can be added to the command to select the hierarchy. In the video hierarchy, a "genre" list of an audio track selection will be used to indicate a "media kind" list of the video track selection, via step 904. As with the genre list, the media kind list is dynamic and may be updated to add, modify, or remove existing entries.

Once a media kind has been selected, next the existing categories, such as "Artist", "Album", and "Song/Track" are then used to further narrow the selection until the desired content is found, via step 904. Next it is determined if the categories selected return a single entry, via step 906. If the categories selected provides multiple entries, then one of the entries must be selected. For example, for a television show if there are several seasons, then one of the seasons must be selected. For some media kinds (e.g., movies), the categories will return a single entry and the accessory can, for example, provide a shortcut to a next level down. Similarly, for television shows, the Season menu may be omitted on the portable media player if all the episodes are from a single season. Video podcasts operate just like television shows. Music videos are also like television shows except that they do not currently use album names. In one embodiment, when browsing through the music hierarchy, video-only tracks will be filtered out. Hybrid tracks (like video podcasts) can appear in both hierarchies.

A method and system in accordance with the present invention provides a system that allows a portable media player to control settings of portable media player when receiving video from an accessory, to control playback of the portable media player and to provide for navigation between video tracks in a hierarchical fashion. In so doing, a portable media player can then utilize this information to provide for the maximum functionality of the accessory when connected to the portable media player.

Although the present invention has been described in accordance with the embodiments shown, one of ordinary skill in the art will readily recognize that there could be variations to the embodiments and those variations would be within the spirit and scope of the present invention. For example, the present invention can be implemented using hardware, software, a computer readable medium containing program instructions, or a combination thereof. Software written according to the present invention is to be either stored in some form of computer-readable medium such as a memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

The invention claimed is:

1. A connector interface system for an accessory device, the connector interface system comprising:
   an interface capable of communicating video settings with a portable media player using a plurality of commands, the plurality of commands including:
      a first command for requesting a video preference of the portable media player;
      a second command for receiving a current setting of the video preference from the portable media player, the second command being received in response to the first command;
      a third command for retrieving video preferences supported by the portable media player; and
      a fourth command for sending a new setting for the video preference, selected from among the retrieved preferences, to the portable media player, thereby changing the video preference of the portable media player, the fourth command being sent in response to the third command.

2. The connector interface system of claim 1 wherein the interface comprises a wireless interface.

3. The connector interface system of claim 1, wherein the interface includes a plurality of signal contacts coupled to the interface.

4. The connector interface system of claim 3 wherein the plurality of signal contacts includes a plurality of serial pins and wherein the video preferences are controlled by communicating the plurality of commands with the portable media player via the serial pins.

5. The connector interface system of claim 1, wherein the interface includes a plurality of signal contacts coupled to the interface, wherein at least a portion of the signal contacts are utilized to communicate the plurality of commands.

6. The connector interface system of claim 5 wherein the plurality of signal contacts comprises a connector.

7. The connector interface system of claim 6 wherein the connector comprises:
   a keying arrangement, wherein one set of keys are separated by one length and another set of keys are separated by another length; and
   a plurality of signal contacts, wherein the plurality of contacts comprise at least one digital ground contact, at least one charge ground contact, at least one USB signal contact, at least one USB power contact, an accessory identify signal contact, at least one charge input power contact, at least one video contact, at least one accessory power contact, at least one accessory protocol contact, an accessory detect signal contact, a remote sense signal contact, at least one line signal, and at least one signal contact, wherein at least one of the contacts is active when a device is coupled to an accessory.

8. The connector interface system of claim 1 wherein the video preferences comprise a screen configuration preference and a video format preference.

9. The connector interface system of claim 8 wherein there are values associated with each of the video preferences, wherein each value associated with a particular video preference indicates a particular format.

10. The connector interface system of claim 9 wherein the values associated with the screen configuration preference include a first value associated with a fullscreen format and a second value associated with a widescreen format.

11. The connector interface system of claim 9 wherein the values associated with the video format include a first value associated with an NTSC format and a second value associated with a PAL format.

12. A computer readable storage medium containing program instructions executable by an accessory communicably coupled to a portable media player to provide video settings for the portable media player, the program instructions including program instructions for:
   sending a first command to the portable media player, the first command requesting a current video preference of the portable media player;
   receiving a second command, in response to the first command, from the portable media player, the second command including a current setting of the video preference within the portable media player;
   receiving a third command from the portable media player; the third command including a listing of video options supported by the portable media player; and
   sending a fourth command, in response to the third command, to the portable media player, the fourth command including a new setting for the current video preference within the portable media player;
   wherein the portable media player responds to the fourth command by setting the video preference to correspond to the new setting.

13. The computer readable storage medium of claim 12 wherein the video preferences comprise a screen configuration and a video format.

14. The computer readable storage medium of claim 13 wherein there are values associated with each of a plurality of video preferences, wherein each value associated with a particular video preference indicates a particular format.

15. The computer readable storage medium of claim 14 wherein the values associated with a screen configuration video preference include a first value associated with a fullscreen format and a second value associated with a widescreen format.

16. The computer readable storage medium of claim 14 wherein the values associated with a video format video preference include a first value associated with an NTSC format and a second value associated with a PAL format.

17. An accessory comprising:
   a device; and
   a connector interface system capable of communicating with the device, the connector interface system comprising an interface configured to communicate video settings with a portable media player-using a plurality of commands the plurality of commands including:
      a first command for requesting a video preference of the portable media player;

a second command for receiving a current setting of the video preference from the portable media player, the second command being received in response to the first command;

a third command for receiving a listing of video options supported by the portable media player; and a fourth command for sending a new setting for the video preference to the portable media player, thereby changing the video preference of the portable media player, the fourth command being sent in response to the third command.

18. The accessory of claim 17 wherein the interface comprises a wireless interface.

19. The accessory of claim 17 wherein the interface includes a plurality of signal contacts coupled to the interface.

20. The accessory of claim 19 wherein the plurality of signal contacts includes a plurality of serial pins and wherein the video preferences are controlled by communicating the plurality of commands with the media player via the serial pins.

21. The accessory of claim 17, wherein the interface includes a plurality of signal contacts coupled to the interface, wherein at least a portion of the signal contacts are utilized to communicate the plurality of commands.

22. The accessory of claim 21 wherein the plurality of signal contacts comprises a connector.

23. The accessory of claim 22 wherein the connector comprises:

a keying arrangement, wherein one set of keys are separated by one length and another set of keys are separated by another length; and a plurality of signal contacts, wherein the plurality of contacts comprise at least one digital ground contact, at least one charge ground contact, at least one USB signal contact, at least one USB power contact, an accessory identify signal contact, at least one charge input power contact, at least one video contact, at least one accessory power contact, at least one accessory protocol contact, an accessory detect signal contact, a remote sense signal contact, at least one line signal, and at least one signal contact, wherein at least one of the contacts is active when a device is coupled to the accessory.

24. The accessory of claim 17 wherein the video preferences comprise a screen configuration preference and a video format preference.

25. The accessory of claim 24 wherein there are values associated with each of the video preferences, wherein each value associated with a particular video preference indicates a particular format.

26. The accessory of claim 25 wherein the values associated with the screen configuration preference include a first value associated with a fullscreen format and a second value associated with a widescreen format.

27. The accessory of claim 25 wherein the values associated with the video format preference include a first value associated with an NTSC format and a second value associated with a PAL format.

28. A method for providing video settings for a portable media player, the method comprising, by an accessory communicably coupled to the portable media player:

sending a first command to the portable media player, the first command requesting a current video preference of the portable media player;

receiving a second command from the portable media player in response to the first command, the second command including a current parameter value indicating the current video preference; and sending a third command to the portable media player in response to the second command, the third command including a new parameter value for the current video preference, wherein the media player responds to the third command by setting the video preference to correspond to the new parameter value.

29. The method of claim 28 wherein the current video preference is a screen configuration preference.

30. The method of claim 29 wherein the current parameter value and the new parameter value for the screen configuration preference are each selected from a group of values that includes at least:

a first value corresponding to a widescreen configuration; and a second value corresponding to a fullscreen configuration.

31. The method of claim 28 wherein the current video preference is a video format preference.

32. The method of claim 31 wherein the current parameter value and the new parameter value for the video format preference are each selected from a group of values that includes at least:

a first value corresponding to an NTSC format; and a second value corresponding to a PAL format.

33. The method of claim 28 further comprising:

sending a fourth command to the portable media player, the fourth command requesting video options supported by the portable media player; and receiving the supported video options from the media player.

34. An accessory for use with a portable media player, the accessory comprising:

an interface adapted to be coupled with a portable media player and capable of supporting an accessory protocol for exchanging with the portable media player commands and information related to playback of video tracks stored on the portable media player; and a control module coupled to the interface, the control module being adapted to:

send a first command via the interface to the portable media player, the first command requesting a current video preference of the portable media player;

receive a second command from the portable media player via the interface, the second command being received in response to the first command and including a current parameter value indicating the current video preference; and send a third command to the portable media player via the interface in response to the second command, the third command including a new parameter value for the current video preference, wherein the portable media player responds to the third command by setting the video preference to correspond to the new parameter value.

35. The accessory of claim 34 wherein the interface comprises a connector having a plurality of signal pins, the signal pins being arranged to mate with corresponding signal pins on a mating connector of the portable media player.

36. The accessory of claim 35 wherein the plurality of signal pins includes a pair of serial pins and wherein the first command and the second command are sent via a transmit pin of the pair of serial pins.

37. The accessory of claim 36 wherein the plurality of signal pins further includes:

a ground pin and a power pin;

an accessory identify signal pin;

an accessory detect signal pin; and a video output pin.

38. The accessory of claim 37 wherein the plurality of signal pins further includes:
   a USB signal pin; and
   a USB power pin.

39. The accessory of claim 38 wherein the plurality of signal pins further includes:
   a Firewire signal pin; and
   a Firewire power pin.

40. The accessory of claim 37 wherein the plurality of signal pins further includes an accessory power pin.

41. The accessory of claim 37 wherein the plurality of signal pins further includes a line signal pin.

42. The accessory of claim 35 wherein the connector comprises:
   a keying arrangement including a first set of keys separated by a first length and a second set of keys separated by a different length.

43. The accessory of claim 34 wherein the current video preference is a screen configuration preference.

44. The accessory of claim 43 wherein the current parameter value and the new parameter value for the screen configuration preference are each selected from a group of values consisting of:
   a first value corresponding to a widescreen configuration; and
   a second value corresponding to a fullscreen configuration.

45. The accessory of claim 34 wherein the current video preference is a video format preference.

46. The accessory of claim 45 wherein the current parameter value and the new parameter value for the video format preference are each selected from a group of values consisting of:
   a first value corresponding to an NTSC format; and
   a second value corresponding to a PAL format.

47. The accessory of claim 34 wherein the control module is further adapted to:
   send a fourth command to the portable media player, the fourth command requesting video options supported by the portable media player; and
   receive the supported video options from the media player.

* * * * *